(12) United States Patent
Thiel et al.

(10) Patent No.: US 8,374,596 B2
(45) Date of Patent: Feb. 12, 2013

(54) METHOD AND APPARATUS FOR DERIVING PATHLOSS ESTIMATION VALUES

(75) Inventors: Stefan Ulrich Thiel, Newbury (GB); Mohsen Zadeh-Koochak, Woolton Hill (GB); Michael Joseph Flanagan, Chester, NJ (US)

(73) Assignee: Arieso Limited (GB)

( * ) Notice: Subject to any disclaimer, the term of this patent is extended or adjusted under 35 U.S.C. 154(b) by 349 days.

(21) Appl. No.: 12/643,192

(22) Filed: Dec. 21, 2009

(65) Prior Publication Data

US 2011/0059735 A1 Mar. 10, 2011

Related U.S. Application Data

(60) Provisional application No. 61/240,778, filed on Sep. 9, 2009.

(51) Int. Cl.
*H04W 24/00* (2009.01)
(52) U.S. Cl. .................. 455/423; 455/422.1; 455/424; 455/425
(58) Field of Classification Search ........... 455/422.1, 455/423, 424, 425, 446, 501, 452, 509, 522, 455/436, 67.11, 63.1; 370/329, 235, 252, 312, 913
See application file for complete search history.

(56) References Cited

U.S. PATENT DOCUMENTS

| | | | | |
|---|---|---|---|---|
| 6,097,957 | A * | 8/2000 | Bonta et al. | 455/446 |
| 7,043,254 | B2 * | 5/2006 | Chawla et al. | 455/456.1 |
| 2002/0107013 | A1 * | 8/2002 | Fitzgerald | 455/423 |
| 2008/0085692 | A1 * | 4/2008 | Hart et al. | 455/187.1 |
| 2012/0028629 | A1 * | 2/2012 | Liu et al. | 455/422.1 |

\* cited by examiner

*Primary Examiner* — Kathy Wang-Hurst
(74) *Attorney, Agent, or Firm* — Frank M. Scutch, III

(57) ABSTRACT

A method for deriving pathloss estimation values within a cellular communication network. The method comprises receiving pathloss data obtained from a plurality of wireless communication units located within the cellular communication network, receiving location information corresponding to the plurality of wireless communications units, associating received pathloss data with individual sectors within a coverage area of the cellular communication network based at least partly on the location information for the respective wireless communications unit, and deriving pathloss estimation values for individual sectors within the cellular communication network based at least partly on the received pathloss data.

18 Claims, 6 Drawing Sheets

METHOD AND APPARATUS FOR DERIVING PATHLOSS ESTIMATION VALUES

CROSS REFERENCE TO RELATED APPLICATION

This application claims priority under 35 U.S.C. §119(e) to U.S. Provisional Patent Application No. 61/240,778, filed Sep. 9, 2009, the entire disclosure of which is hereby incorporated herein by reference.

FIELD OF THE INVENTION

The field of the invention relates to a method and apparatus for deriving pathloss estimation values, and in particular to a method and apparatus for deriving pathloss estimation values within a cellular communication network.

BACKGROUND OF THE INVENTION

Wireless communication systems, such as the $2^{nd}$ Generation (2G) (otherwise referred to as Global System for Mobile (GSM) communications) and the $3^{rd}$ Generation (3G) of mobile telephone standards and technology, are well known. An example of such 3G standards and technology is the Universal Mobile Telecommunications System (UMTS), developed by the 3' Generation Partnership Project (3GPP) (www.3gpp.org).

Typically, wireless communication units, or User Equipment (UE) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more communication cells to which UEs may attach, and thereby connect to the network.

The consumer pressure for less expensive and faster services anytime and to any location, has led to the requirement for significant improvements in the planning and optimization of such cellular communication networks, in order to make the most of limited resources.

A problem with current planning and optimization techniques, as identified by the inventors of the present invention is that the same parameters for estimating path loss are typically used throughout all sectors of a geographical area of interest, such as a city, country, etc. However, in reality, path loss characteristics vary from sector to sector. As a result, such known planning and optimization techniques result in inaccurate and unrealistic pathloss estimations, and thus suboptimal planning and optimization of the network.

In order to provide more accurate pathloss estimations for network planning and optimization, the pathloss characteristics for individual sectors are required to be more accurately modelled. However, traditionally in order to achieve this, drive test data is required to enable the pathloss characteristics for individual sectors to be accurately calibrated. Drive tests are typically carried out in regular intervals to provide a measure of the quality of the network, or may be specifically performed to investigate certain problems, such as when the performance of the network is not operating as well as desired. In such drive tests, a vehicle records data such as cell scrambling codes and their corresponding received signal strength, along with location information, for example obtained via a GPS (Global Positioning System) receiver. Performing such drive tests throughout an entire network is an expensive and time consuming undertaking. Furthermore, such drive test data is required to be continually updated in order to take into account environmental changes, such as the construction of new buildings, growth of trees and changes in their foliage, etc.

Thus, there is a need for an improved method and apparatus for deriving pathloss information within a cellular communication network, whereby at least some of the above mentioned problems with known techniques are substantially alleviated.

SUMMARY OF THE INVENTION

Accordingly, the invention seeks to mitigate, alleviate or eliminate one or more of the abovementioned disadvantages singly or in any combination.

According to a first aspect of the invention, there is provided a method for deriving pathloss estimation values within a cellular communication network. The method comprises receiving pathloss data obtained from a plurality of user equipment (UEs) located within the cellular communication network, receiving location information corresponding to the plurality of UEs, and associating received pathloss data with individual sectors within a coverage area of the cellular communication network based at least partly on the location information for the respective UEs. The method further comprises deriving pathloss estimation values for individual sectors within the cellular communication network, based at least partly on the received pathloss data.

In this manner, UEs are able to provide substantially real-time pathloss data, and the location to which such pathloss data relates may be identified, without the need for drive tests to be carried out. Furthermore, such pathloss data may be continuously updated by UEs within the network, thereby ensuring substantially up-to-date data is available for deriving the pathloss estimation values.

In one optional embodiment of the invention, the pathloss data obtained from a UE may comprise pathloss data for at least one cell of the cellular communication network, as provided by the UE to the cellular communication network as part of cell selection/reselection process. For example, the pathloss data obtained from a UE may comprise Ec/Io values for at least one cell of the cellular communication network. Alternatively, the pathloss data obtained from a UE may comprise RSCP (Received Signal Code Power) values for at least one cell of the cellular communication network.

In this manner, the pathloss data may be readily available from the cellular communication network without any additional messaging, etc. being required between, say, the network and the UEs, in order for the UEs to obtain the pathloss data.

In one optional embodiment of the invention, a sector may be defined by an area covering the locations of those UEs from which pathloss data was obtained for a particular base transceiver station. Furthermore, a sector may comprise area bins within, or overlapped by, the area covering the locations of those UEs from which pathloss data was obtained for a particular base transceiver station.

In one optional embodiment of the invention, the step of deriving pathloss estimation values for individual sectors within the cellular communication network may comprise: generating pathloss reference values for each sector from received pathloss data; calculating pathloss estimate values for each sector based on sector specific parameters; and calibrating the sector specific parameters individually for each sector using the pathloss reference.

In this manner, pathloss estimations may be made for individual sectors, for example in order to enable network modelling for varying power level transmissions from BTSs, whereby the pathloss estimations use sector specific parameters that have been calibrated using actual pathloss data obtained from UEs within the network. Furthermore, as previously mentioned, such pathloss data may be substantially continuously updated using real time data from UEs, thus enabling the parameters used for generating the pathloss estimations to be regularly re-calibrated to ensure accurate modelling of the radio environment. In particular, accurate pathloss estimations may be derived without the need for drive tests to be carried out.

In one optional embodiment of the invention, the pathloss reference values may be generated for each sector by way of arranging received pathloss data for each sector into area bins, and thus, for each sector, the method generates bin Echo reference values based on the received pathloss data.

In one optional embodiment of the invention, pathloss estimate values for each sector may be calculated by way of calculating a pathloss value (PL) for each area bin within the sector by way of a standard slope intercept formula comprising sector specific parameters, and using the pathloss value (PL) for each bin to calculate an Echo estimate value for each bin.

In one optional embodiment of the invention, the sector-specific parameters may be calibrated by: comparing the pathloss estimate values with the pathloss reference values; generating a baseline error value for the sector from the result of the comparison; refining the sector specific parameters and re-calculating the pathloss estimate values. This embodiment may further comprise comparing the re-calculated pathloss estimate values with the pathloss reference values; generating a new error value for the sector from the result of this comparison; and comparing the new error value to the baseline error value.

In one optional embodiment of the invention, once the sector-specific parameters for all sectors have been calibrated, bin-specific pathloss parameters may be refined.

In one optional embodiment of the invention, location information corresponding to the plurality of UEs may be obtained by way of geo-location techniques. Alternatively, location information corresponding to the plurality of UEs may be obtained by way of Global Positioning System (GPS) techniques. Furthermore, the pathloss data and location information may be obtained over a period of time.

In one optional embodiment of the invention, the method may further comprise dividing a sector into sub-sectors, associating received pathloss data with individual sub-sectors based at least partly on the location information for the respective UEs, and deriving pathloss estimation values for individual sub-sectors within the cellular communication network based at least partly on the received pathloss data.

According to a second aspect of the invention, there is provided a network element for a cellular communication system adapted to comprise signal processing logic arranged to perform the method of the first aspect of the invention.

According to a third aspect of the invention, there is provided a cellular communication system comprising the network element of the second aspect of the invention.

According to a fourth aspect of the invention, there is provided a computer-readable storage element having computer-readable code stored thereon for programming a signal processing logic module to perform a method for deriving pathloss estimation values within a cellular communication network. The code is operable for receiving pathloss data obtained from a plurality of user equipments (UEs) located within the cellular communication network, receiving location information corresponding to the plurality of UEs, and associating received pathloss data with individual sectors within a coverage area of the cellular communication network based at least partly on the location information for the respective UEs. The code is further operable for deriving pathloss estimation values for individual sectors within the cellular communication network based at least partly on the received pathloss data.

These and other aspects, features and advantages of the invention will be apparent from, and elucidated with reference to, the embodiments described hereinafter.

BRIEF DESCRIPTION OF THE DRAWINGS

Embodiments of the invention will be described, by way of example only, with reference to the accompanying drawings, in which.

DETAILED DESCRIPTION OF PREFERRED EMBODIMENTS

Figure 1:
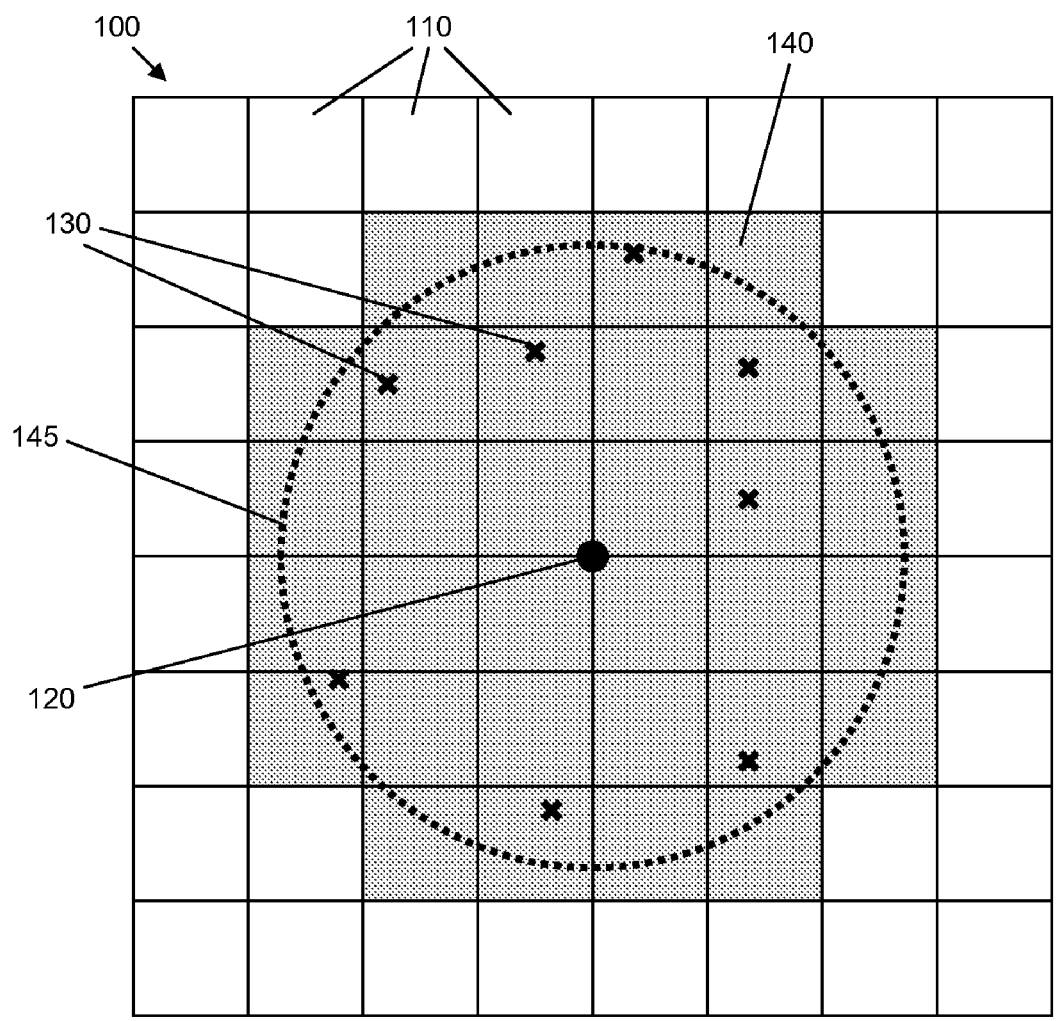
FIG. 1 illustrates a simplified example of a representation of a part of a geographical area for which pathloss estimations for a cellular communication system are required or desired.

Referring now to FIG. 1, there is illustrated a simplified example of a representation of a part of a geographical area 100, such as a city, a county, a country, etc, for which pathloss estimations for a cellular communication system are required or desired. The geographical area 100 is divided into area bins 110, which for the illustrated example are tessellated in a regular manner, and in particular for the illustrated example comprise generally square configurations, such that the geographical area 100 is divided up in a checkerboard type pattern. However, it is envisaged that the bins 110 may comprise any suitable dimensions or form. For example, in some embodiments each bin may be between fifty to two hundred meters to a side. Thus, for a typical bin size of, say, 100 meters by 100 meters, each bin 110 comprises an area of 0.01 square kilometers.

Typically, wireless communication units, or User Equipment (UE) as they are often referred to in 3G parlance, communicate with a Core Network (CN) of a cellular communication system, such as a 3G wireless communication system, via a Radio Network Subsystem (RNS). A cellular communication system typically comprises a plurality of radio network subsystems, each radio network subsystem comprising one or more base transceiver stations (BTSs). Each BTS is arranged to support one or more communication cells to which UEs may attach, and thereby connect to the network. An example of such a BTS is illustrated in FIG. 1 at 120. As will be appreciated by a skilled artisan, typically a plurality of such BTSs 120 may be located throughout the geographical area 100 and arranged such that they support cellular network coverage over substantially the entire geographical area 100.

In order to provide accurate pathloss estimations, for example for the purpose of network planning and/or network optimization, the pathloss characteristics for transmissions from individual BTSs are required to be modelled using accurate pathloss estimation values.

Figure 2:
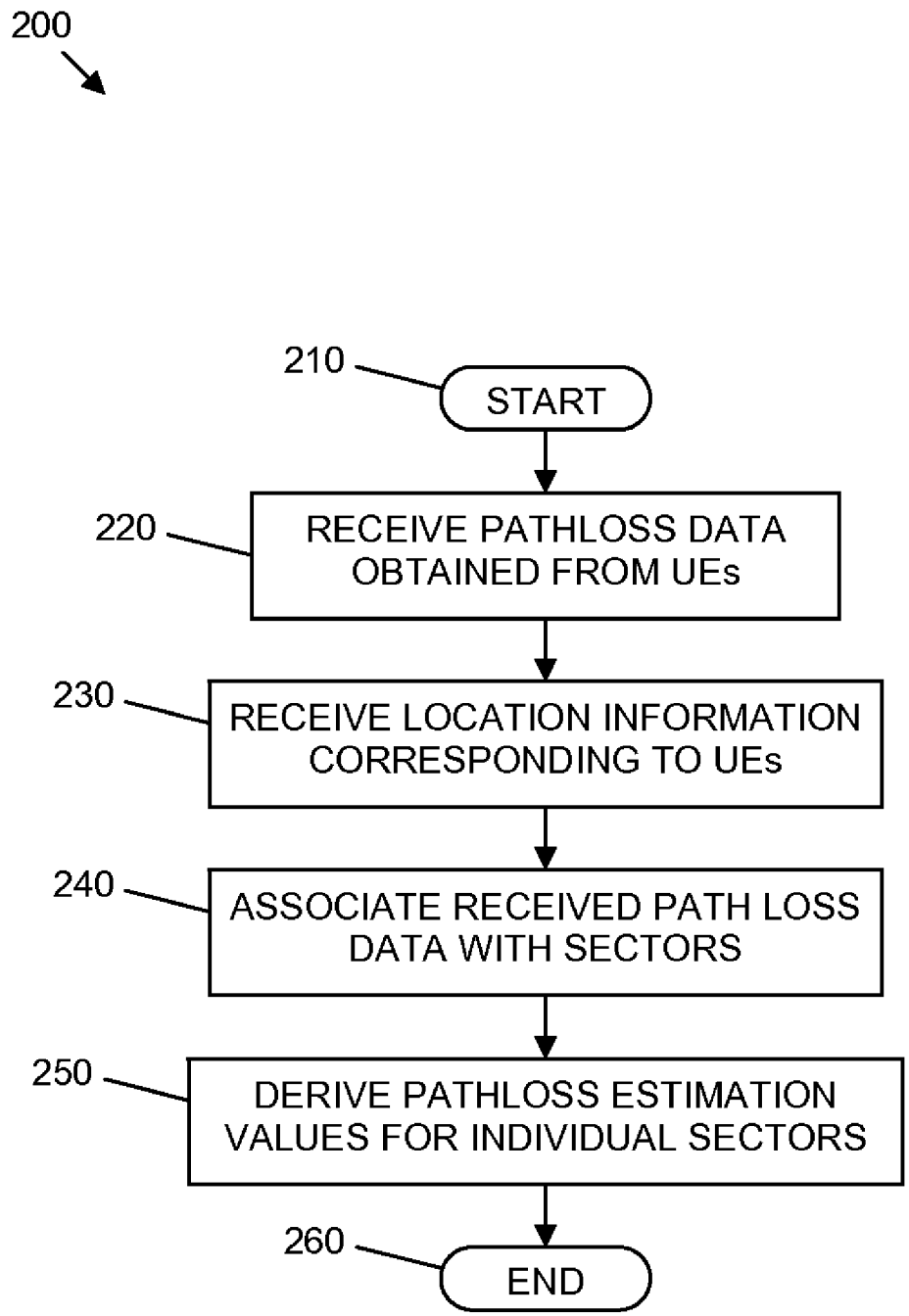
FIG. 2 illustrates an example of a simplified flowchart of a method for deriving pathloss estimation values within a cellular communication network according to some embodiments of the invention.

Referring now to FIG. 2, there is illustrated an example of a simplified flowchart 200 of a method for deriving pathloss estimation values within a cellular communication network, such as may be implemented by an Operations Support System (OSS) of a network operator, according to some embodiments of the invention. The method starts at step 210, and moves on to step 220 where pathloss data obtained from a plurality of user equipments (UEs) located within the cellular communication network is received. Next, in step 230, location information corresponding to the plurality of UEs is received. The received pathloss data is then associated with individual sectors within the coverage area of the cellular communication network area based at least partly on the location information for the respective UEs, in step 240. Next, in step 250 pathloss estimation values for individual sectors within the cellular communication network are derived based at least partly on the received pathloss data. The method then ends at step 260. In accordance with some embodiments of the invention, further data and/or information that may be used to derive pathloss estimation values may include, by way of example only, signal-to-noise ratio information such as Ec/Io (ratio of the average power of a channel, typically the pilot channel, to the total signal power), received power information such as RSCP (received signal code power), call quality details such as 'dropped' or 'blocked', call-ending reasons such as 'lost uplink synchronization' or 'excessive downlink transmit power', etc.

For example, referring back to FIG. 1, one or more UEs 130 located within the geographical area 100 may make pathloss measurements for transmissions from the BTS 120, and provide these measurements back to the core network, for example via one or more cells to which they are attached. Such cells may be supported by BTS 120 or may be supported by neighbouring BTSs (not shown).

For 3G cellular communication networks, UEs regularly perform such pathloss measurements for nearby cells as part of their cell selection/reselection process, and the pathloss data corresponding to the neighbouring cells is provided to the network. Such a cell selection/reselection process is defined in the 3GPP technical specification 3GPP TS 25.331, 'Radio Resource Control (RRC) Protocol Specification'. Accordingly, the pathloss data obtained from a UE may comprise pathloss data for one or more communication cells provided by the UE to the cellular communication network as part of a cell selection/reselection process. For example, the pathloss data obtained from a UE may comprise Ec/Io values for one or more cells, where Ec/Io is the ratio of received energy for a pilot channel (Ec), for example the Common PIlot CHannel (CPICH), to the total received energy (Io). Alternatively, or additionally, the pathloss data obtained from a UE may comprise received signal code power (RSCP) values for one or more cells.

Thus, for step 220 of the method of FIG. 2, in a 3G network, the pathloss data may be readily available from the cellular network without any additional messaging etc. required between, say, the network and the UEs in order for the UEs to obtain the pathloss data.

In accordance with some embodiments of the invention, the location information corresponding to the UEs may be obtained using any suitable technique. For example, the location information for a UE may be obtained using a geo-locating technique. Geo-location techniques are known in the art, and for example utilize measurement information for nearby cells provided by a UE, in combination with the known (fixed) location for those cells, to calculate the location of the UE. An improved geo-locating technique is described in the applicant's co-pending patent application, No. 61/144,242, and is incorporated by reference herein.

Alternatively, or additionally, a Global Positioning System (GPS) technique may be used to locate one or more UEs. For example, a UE may comprise GPS receiver functionality, enabling the UE to identify its general location, and to provide information relating to its identified location to, say, the core network.

In this manner, UEs 130 provide substantially real-time pathloss data, and the location to which such pathloss data relates may be identified, without the need for drive tests to be carried out. Furthermore, such pathloss data may be continuously updated by UEs within the network, thereby ensuring that substantially up-to-date data is available for deriving the pathloss estimation values.

As previously mentioned, the received pathloss data is associated with individual sectors within a coverage area of the cellular communication network based at least partly on the received location information for the respective UEs. Referring back to FIG. 1, an example of a sector is illustrated at 140. The sector 140 may be defined by an area covering the locations of those UEs 130 from which pathloss data was obtained for that BTS 120. For the illustrated embodiment, the sector 140 is characterised by a substantially circular area 145 having its centre located generally at the BTS 120, and its radius such that the sector 140 covers the locations of those UEs 130 from which pathloss data was obtained for that BTS 120. The sector 140 may then be defined in terms of those bins 110 within, or overlapped by, the substantially circular area 145.

As illustrated in FIG. 1, a sector typically covers or overlaps a plurality of bins 110. For example, as previously mentioned, a typical sized bin of, say, 100 meters by 100 meters comprises an area of 0.01 square kilometers. For a sector covering, say, 10 square kilometers, the sector would cover approximately 1000 bins.

Figure 3:
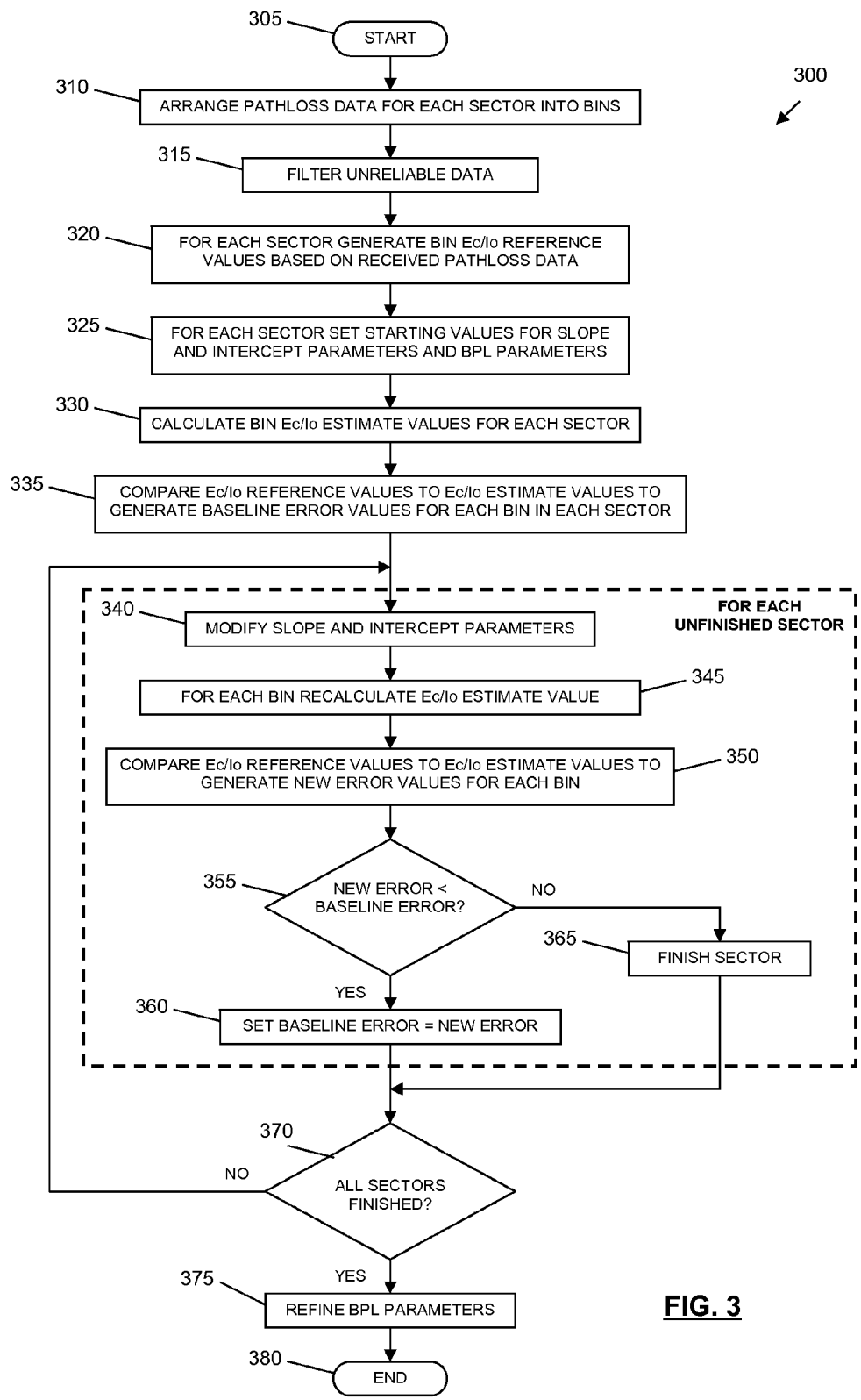
FIG. 3 illustrates an example of a simplified flowchart of a method for deriving pathloss estimation values for individual sectors within the cellular communication network in accordance with some embodiments of the invention.

Referring now to FIG. 3, there is illustrated an example of a simplified flowchart 300 of a method for deriving pathloss estimation values for individual sectors within the cellular communication network based at least partly on the received pathloss data, which may be implemented as step 250 in the method of FIG. 2 in accordance with some embodiments of the invention.

The method starts at step 305, and proceeds with the generation of pathloss reference values from received pathloss data. In particular for the illustrated embodiment, the received pathloss data for each sector is arranged into bins, for example in accordance with the location of the UEs from which the pathloss data was obtained, as shown in step 310.

Potentially, unreliable data may then be filtered out in order to improve the accuracy of the resulting pathloss estimate values, as illustrated in step 315. For example, data corresponding to bins for which only a small number of measurements are available for a particular cell of BTS may be filtered out for statistical reasons. Alternatively, data corresponding to bins that are located outside of an antenna beam width (or behind the main lobe of the antenna) of the relevant BTS may also be filtered out.

Next, in step 320, bin specific pathloss references are generated for each sector based on the (filtered) received pathloss data, which for the illustrated embodiment may be in a form of bin-specific Ec/Io reference values for each sector. For example, a mean or median value for the received pathloss data that corresponds to a bin for a specific sector may be used to generate an Ec/Io reference value for that bin.

Having generated the bin-specific pathloss reference values for each sector, the method then moves on to calculating bin-specific pathloss estimate values for each sector, based on sector specific parameters, and calibrating these parameters individually for each sector using the generated pathloss reference values. For example, for each sector, such as sector 140 of FIG. 1, a pathloss value (PL) may be calculated for each bin 110 within that sector 140 by, way of a standard slope intercept model using a formula such as:

$$PL = s * \text{Log } d + i + bpl + ant \qquad [1]$$

In this formula, the values 's' and 'i' are slope and intercept parameters respectively, and are specific to each individual sector. The formula also comprises bin-specific parameters in the form of the value 'd', which represents a distance between the BTS 120 for the sector 140 and the relevant bin 110, and the value 'bpl', which comprises a bin-specific pathloss value. The value 'ant' represents an antenna pattern element value for the BTS 120 of the sector 140. For example, base station antennas commonly employed in wireless networks have variable gains depending on the pointing direction relative to the user. The gain as a function of the pointing direction is often referred to as a 'pattern'. Thus, the 'ant' term in Equation [1] above enables the particular gain for users in the location under study to be taken into consideration.

Once the pathloss value (PL) for each bin has been calculated, an Ec/Io estimate value for each bin may be calculated using the formula:

$$Ec/Io = \frac{(\text{cpich\_power}/PL)}{\Sigma(\text{cpich\_power}/PL) + (\text{background noise})} \qquad [2]$$

Σ(cpich_power/PL) is the sum of (cpich_power/PL) over all sectors for that bin, and cpich_power is the transmit power for the CPICH of the relevant sector (BTS). As can be seen, the Ec/Io estimate value for a bin in one sector is influenced by that bin's pathloss values (PL) for all other sectors. The 'background noise' parameter may comprise any suitable value that is representative of general background noise. For example, the background noise may comprise anything that is not modelled in the first part of the denominator (Σ(cpich_power/PL)), including other cells, illegal transmitters/jammers, solar flares, etc. A typical value used in mobile telecommunications is −113 dB.

Alternatively, where received pathloss data comprises RSCP (Received Signal Code Power) values, the pathloss estimate values may be calculated using the simpler formula:

$$RSCP = \text{cpich\_power} + \text{gains} - \text{losses} - PL \qquad [3]$$

However, as will be appreciated by a skilled artisan, RSCP values are not always consistently available from UEs, due to variations within air interface requirements, and even network equipment manufacturer implementations.

Referring back to FIG. 3, having generated the pathloss reference values in step 320, the illustrated method moves on to step 325, where starting values are set for the parameters to be calibrated. For the embodiment illustrated in FIG. 3, these parameters comprise the slope (s) and intercept (i) parameters for each sector, as well as the bin-specific pathloss (bpl) parameter. The bin-specific Ec/Io estimate values are then calculated for each sector in step 330. For each sector, the Ec/Io estimate values are compared with the Ec/Io reference values that were previously generated, and a baseline error value is generated for the sector from the result of the comparison, as shown in step 335. For example, the error value may be generated based on a squared difference of averages for the estimate values and the reference values respectively.

Having generated the baseline error value for each sector, the parameters used to generate the Ec/Io estimate values may then be refined in order to improve the accuracy of the Ec/Io estimate values relative to the Ec/Io reference values. For the embodiment illustrated in FIG. 3, the parameters used to generate the Ec/Io estimate values are refined for each sector by way of steps 340 to 370 as follows.

In step 340, the values for the slope (s) and intercept (i) parameters are modified using some suitable optimization algorithm For example, in a simple case, a basic hill climbing algorithm may be used to increase the values for each of the slope and intercept parameters for the sector by determined amounts. Next, in step 345, the Ec/Io estimate values for each bin within the sector are re-calculated. The re-calculated Ec/Io estimate values are then compared with the Ec/Io reference values to generate a new error value for the sector. The new error value is compared to the baseline error value for that sector in step 355. If the new error value is less than the baseline error value, the method moves on to step 360, where the baseline error value is set to equal the new error value, and the method proceeds to step 370. However, if the new error value is not less than the baseline error value, the method moves on to step 365, where the sector is tagged as 'finished', and the method moves on to step 370.

It is contemplated that the values of some of the parameters may be limited. For example, the slope (s) parameter may be limited such that it does not become shallower compared to the slope used for free space propagation.

In step 370, it is determined as to whether all sectors have been tagged as finished. If not, the method loops back to step 340, and the parameters used to generate the Ec/Io estimate values may then be refined for those sectors that are not tagged as finished. Once all sectors have been tagged as finished, i.e. once the sector specific parameters for each sectors have been calibrated, the method moves on to step 375, where for the illustrated embodiment the bin specific pathloss (bpl) parameter for each bin is refined. For example, the bpl parameters may be refined using a similar optimization algorithm as used for the slope and intercept parameters. The bpl may be calculated independently for each bin, for all relevant sectors. The method then ends at step 380.

In this manner, the method illustrated in FIG. 3 enables pathloss estimations to be made for individual sectors, for example in order to enable network modelling for varying power level transmissions from BTSs, whereby the pathloss estimations use sector-specific parameters that have been calibrated using actual pathloss data obtained from UEs within the network. Furthermore, as previously mentioned, such pathloss data may be substantially continuously updated using real-time data from UEs, thus enabling the parameters used for generating the pathloss estimations to be regularly re-calibrated to ensure accurate modelling of the radio environment. In particular, the method illustrated in FIG. 3 enables accurate pathloss estimations to be derived, for example, for use in planning and/or optimization of cellular communication networks, without the need for drive tests to be carried out.

A further advantage of utilising pathloss data that is obtained from a plurality of user equipment (UEs) located within the cellular communication network, as opposed to, say, carrying out drive tests, is that such pathloss data is typically continuously recorded, and not limited to those periods when drive tests are carried out. Accordingly, pathloss data may be obtained over an extended period of time, thereby enabling a more statistically accurate representation of the radio environment to be obtained, thereby maintaining coherency of the data. This period of time for valid pathloss information may be limited to ensure only up-to-date pathloss information is used. Additionally, pathloss information may be selected for specific time periods, and thus pathloss estimation values may be derived that are representative of those specific time periods. In this manner, specific time periods, such as weekends, weekdays, rush hour, a specific season (e.g. winter), etc., may be specifically modelled using such representative pathloss estimation values in order to improve the planning and/or optimization of a network.

Figure 4:
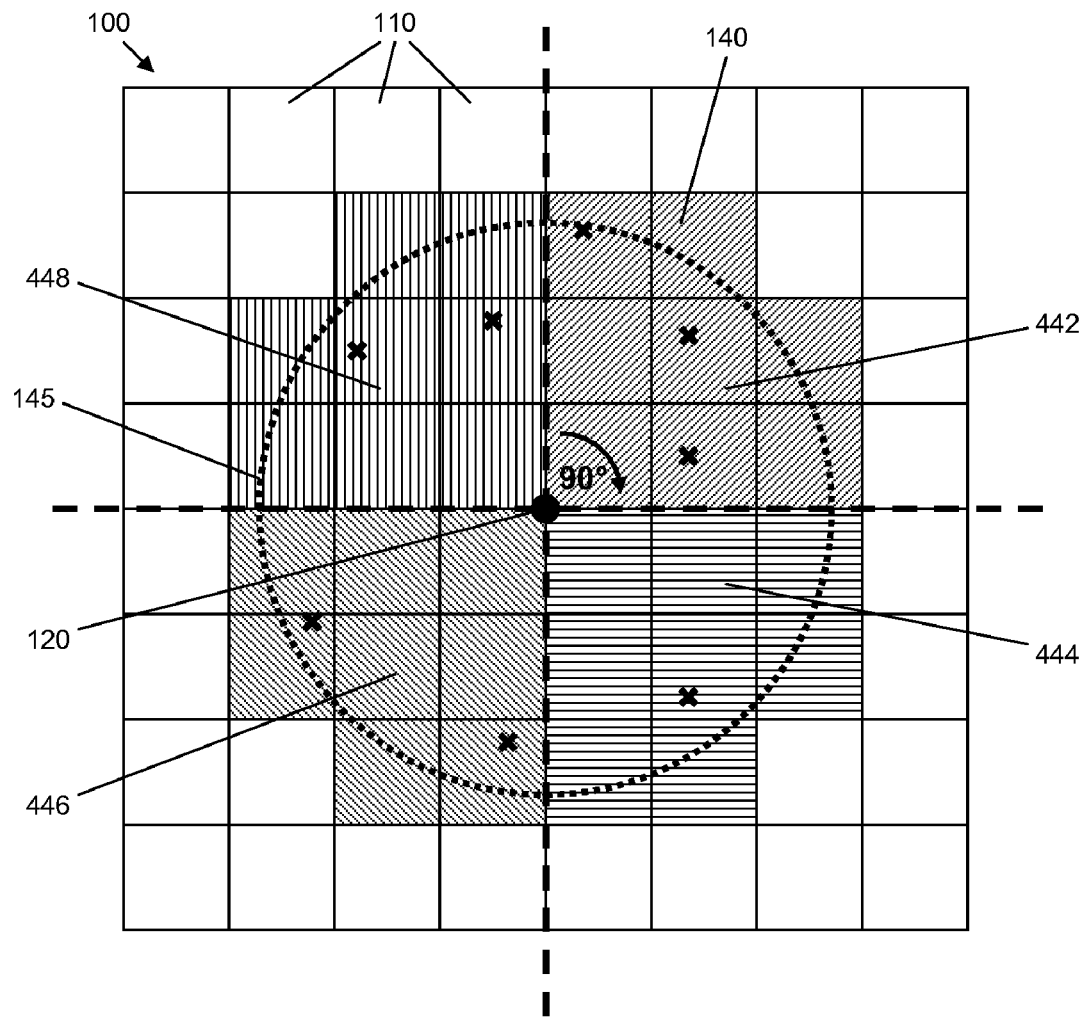
FIG. 4 illustrates an example of a sector divided into sub-sectors in accordance with some embodiments of the invention.
Figure 5:
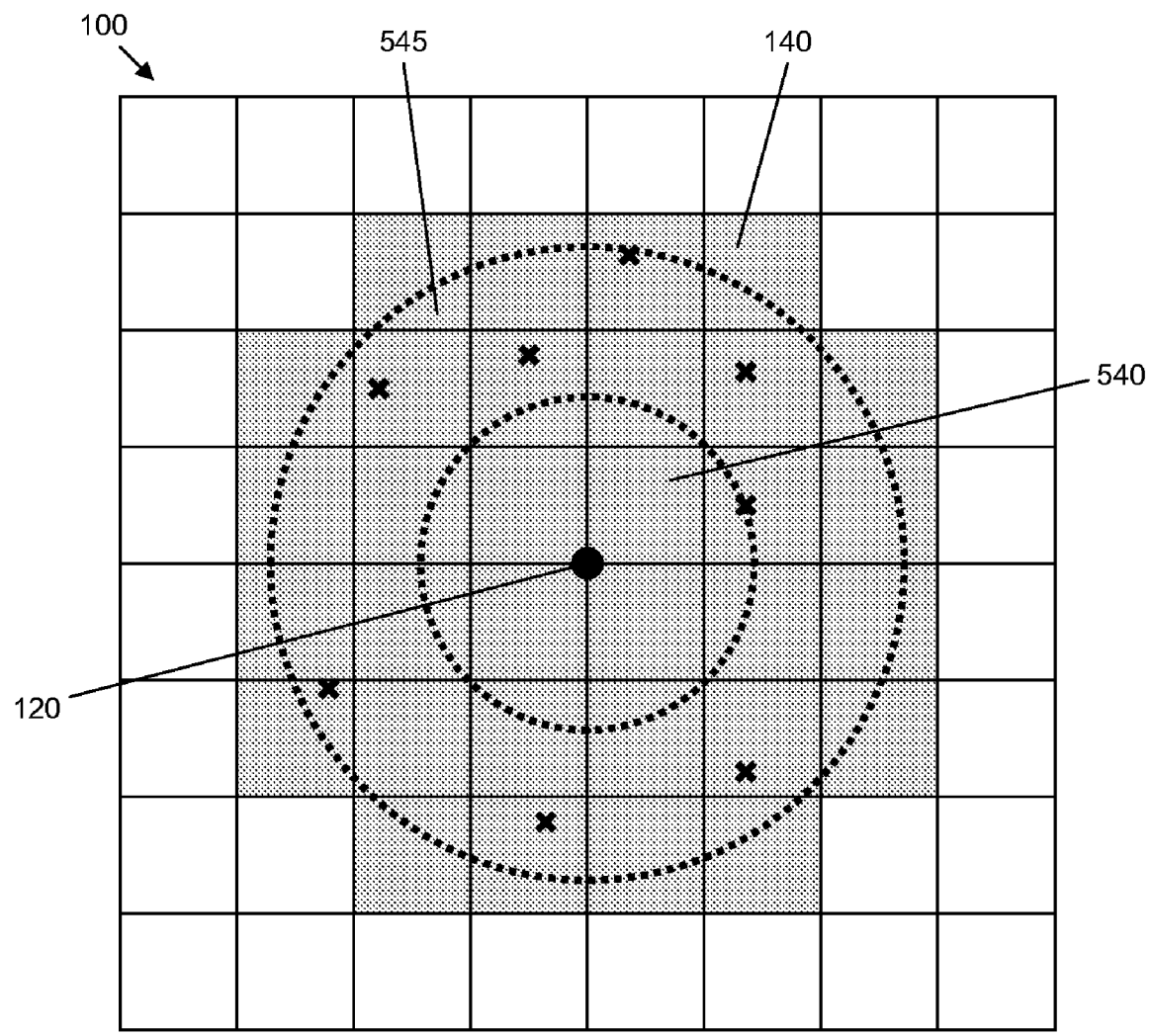
FIG. 5 illustrates a further example of a sector divided into sub-sectors in accordance with some alternative embodiments of the invention.

It is contemplated that, in accordance with some embodiments of the invention, the coverage area of a sector may be divided into sub-sectors, for example as illustrated in FIG. 4. For the example illustrated in FIG. 4, the coverage area of sector 140 is divided into four sub-sectors 442, 444, 446, 448. In particular, the coverage area of sector 140 may be arranged to cover a generally radial distance from the BTS 120 to, say, 1 kilometer there from through a 360° angle. This area in FIG. 4 is divided into the four sub-sectors 442, 444, 446, 448, each covering a radial distance from the BTS 120 to 1 kilometer there from, through a 90° angle. In an alternative embodiment, the coverage area of sector 140 may additionally or alternatively be divided into sub-sectors divided in a generally radially outward manner from the BTS 120. For example, as illustrated in FIG. 5, a first sub-sector 540 may cover a generally radial distance from the BTS 120 to, say, 500 meters there from, while another sub-sector 545 covers a generally radial distance from 500 meters out from the BTS 120 to a 1 kilometer distance from the BTS 120.

In this manner, received pathloss data may be associated with individual sub-sectors, and pathloss estimation values for the individual sub-sectors derived. For example, for the embodiment illustrated in FIG. 3, a sub-sector may be treated in the same manner as a sector, with pathloss estimates being derived for it. As a result, an improved granularity of pathloss estimates within a network may be obtained.

For the various embodiments hereinbefore described, sectors and sub-sectors have been treated substantially independently from the point of view of deriving pathloss estimate values therefor. However, it is contemplated that the derivation of pathloss estimate values for one (sub-) sector may be influenced by those of neighbouring (sub-) sectors. For example, when deriving pathloss estimate values for neighbouring (sub-) sectors, the pathloss estimate values may be restricted such that they propagate smoothly from one (sub-) sector to the next. For example, a two slope approach may be implemented, whereby an algorithm is arranged to decide, on a (sub-) sector by (sub-) sector basis, if a two slope algorithm should be used based upon the error value, and then on the distance to switch from an initial slope to a shallow slope. Such a two-slope model employs two straight-lines (slopes) with a single 'breakpoint'. By forcing the two slope algorithm to have connected slopes (i.e. the two slopes comprise equal values at the breakpoint) and pre-setting the second slope, the complexity of this algorithm may be reduced to a simple choice of distance.

It is further contemplated for alternative embodiments of the invention that co-sited or overlapping sectors may utilize pathloss data for each other, thereby increasing the amount of pathloss data available for those sectors. Furthermore, it is envisaged that secondary information such as a lack of pathloss data available for a bin within a sector may also be utilized. For example, a bin with no pathloss information available is unlikely to have better radio conditions than a bin within the same sector having the worst reported radio conditions.

In the example illustrated in FIG. 3, a single pathloss reference value was calculated for each bin within a sector. However, it is contemplated that for alternative embodiments, instead of using such a single pathloss reference value, a confidence interval may be calculated for each bin within a sector based upon the individual measurements located within the bin. The error value to be calculated for each pathloss estimate value may then depend on the distance of the calculated estimate value to the measured confidence interval. Similarly, the error function may also be extended to comprise some weighting function, for example providing greater importance to bins that have more reported measurements.

Figure 6:
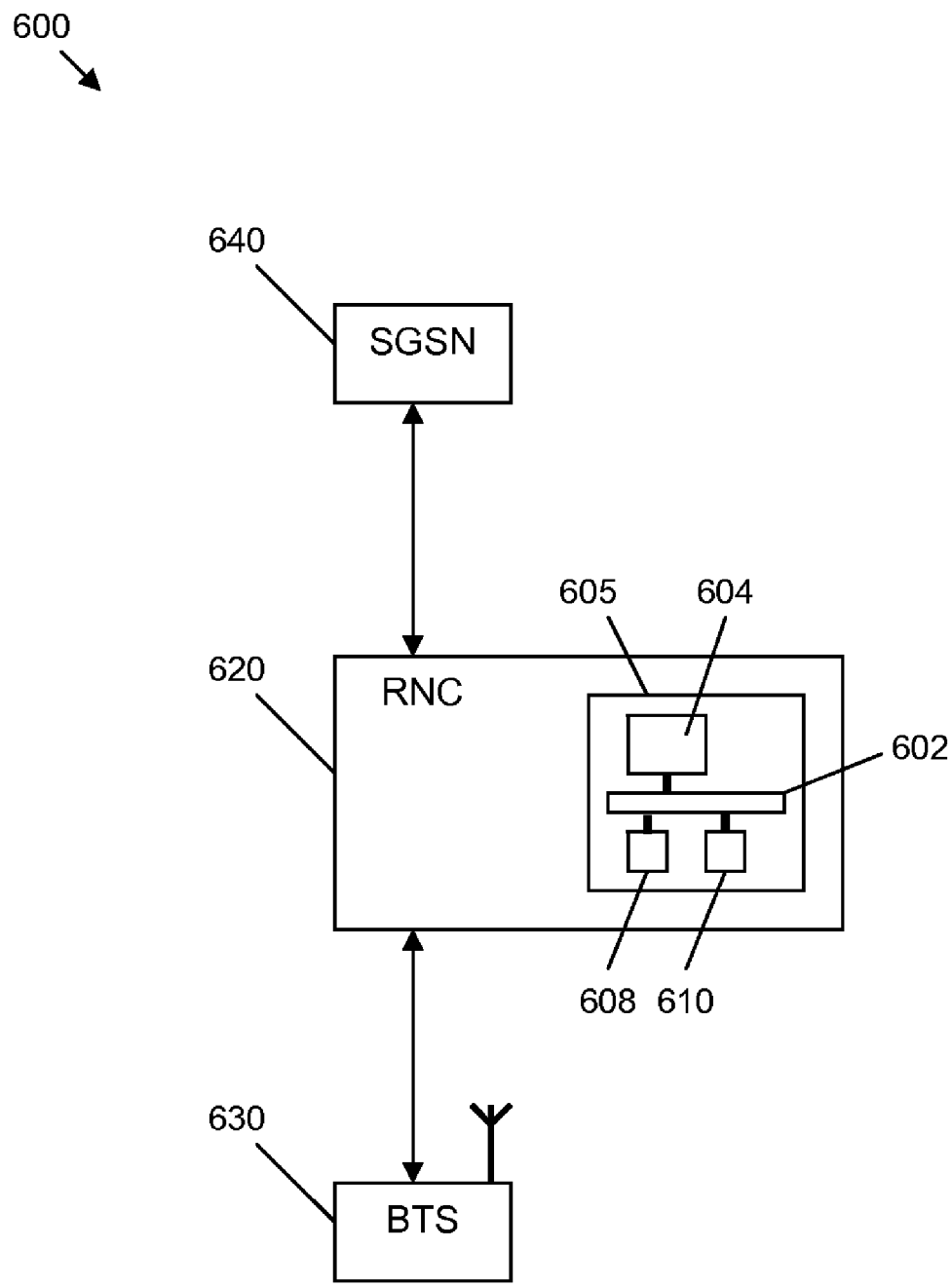
FIG. 6 illustrates a typical computing system that may be employed to implement processing functionality in embodiments of the invention.

Referring now to FIG. 6, there is illustrated an example of a part of a cellular communication system 600 comprising a computing system 605 that may be employed to implement processing functionality in embodiments of the invention. Those skilled in the relevant art will also recognize how to implement the invention using other computer systems or architectures.

For the illustrated embodiment, cellular communication system 600 comprises a 3G network, and computing system 605 forms a part of a network element, and in particular for the illustrated embodiment part of a radio network controller (RNC) 620. However, it is contemplated that the inventive concept herein described may be implemented within alternative computer systems, for example, a desktop, laptop or notebook computer, hand-held computing device (PDA, cell phone, palmtop, etc.), mainframe, server, client, or any other type of special or general purpose computing device as may be desirable or appropriate for a given application or environment. The RNC 620 is operably coupled to one or more base transceiver stations 630, and a support GPRS (General Packet Radio System) support node (SGSN) 640 of the cellular communication system.

Computing system 605 may comprise signal processing logic, such as a digital signal processor 604. Alternatively, the processing signal logic can be implemented using a general or special-purpose processing engine such as, for example, a microprocessor, microcontroller or other control logic module. In this example, signal processing logic is connected to a bus 602 or other communications medium.

Computing system 605 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 605 may likewise include a read only memory (ROM) or other static storage device (not shown) coupled to bus 602 for storing static information and instructions for processor 604.

The computing system 605 may also include information storage system 610, which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. As these examples illustrate, the storage media may include a computer-readable storage medium having particular computer software or data stored therein.

In this document, the terms 'computer program product' 'computer-readable medium' and the like may be used generally to refer to media such as, for example, memory 608, a storage device or storage unit such as may be supported by information storage system 610. These and other forms of computer-readable media may store one or more instructions for use by signal processing logic 604, to cause the processor to perform specified operations. Such instructions, generally referred to as 'computer program code' (which may be grouped in the form of computer programs or other groupings), when executed, enable the computing system 605 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 605 using, for example, a removable storage drive or a communications interface (not shown). The control logic module (in this example, software instructions or computer program code), when executed by the processor 604, causes the signal processing logic 604 to perform the functions of the invention as described herein.

It will be appreciated that, for clarity purposes, the above description has described embodiments of the invention with reference to different functional units or logic module elements or signal processors. However, it will be apparent that any suitable distribution of functionality between different functional units or logic module elements or signal processors, for example with respect to the UE base station or RNC, may be used without detracting from the invention. For example, it is envisaged that functionality illustrated to be performed by separate processors or controllers or logic module elements may be performed by the same processor or controller or logic module element. Hence, references to specific functional or logical units are only to be seen as references to suitable means for providing the described functionality, rather than indicative of a strict logical or physical structure or organization.

Some aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the invention has been described in connection with some embodiments, it is not intended to be limited to the specific form set forth herein. Rather, the scope of the invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, a method and apparatus for deriving pathloss estimation values within a cellular communication network, has been described that may alleviate at least some of the shortcomings of past and present techniques and/or mechanisms.

The invention claimed is:

1. A method for deriving pathloss estimation values within a cellular communication network, the method comprising:
   receiving pathloss measurement data obtained from a plurality of wireless communication units located within the cellular communication network;
   receiving location information corresponding to the plurality of wireless communication units;
   associating received pathloss measurement data with individual sectors within a coverage area of the cellular communication network based at least partly on the location information for the respective wireless communications units that sent the pathloss measurement data and location information; and
   filtering out unreliable received pathloss measurement data, wherein the filtering out comprises filtering out received pathloss measurement data corresponding to locations outside an antenna main lobe for a sector;
   deriving pathloss estimation values for individual sectors within the cellular communication network based at least partly on the filtered pathloss measurement data.

2. The method of claim 1, wherein the pathloss data obtained from a wireless communication unit comprises pathloss data for at least one cell of the cellular communication network provided by the wireless communication unit to the cellular communication network as part of cell selection/reselection process.

3. The method of claim 2, wherein the pathloss data obtained from a wireless communication unit comprises Ec/Io values for at least one cell of the cellular communication network.

4. The method of claim 2, wherein the pathloss data obtained from a wireless communication unit comprises Received Signal Code Power, RSCP, values for at least one cell of the cellular communication network.

5. The method of claim 1, wherein a sector is defined by an area covering the locations of those wireless communication units from which pathloss data was obtained for a particular base transceiver station.

6. The method of claim 5, wherein a sector comprises area bins within or overlapped by the area covering the locations of those wireless communication units from which pathloss data was obtained for a particular base transceiver station.

7. The method of claim 1, wherein deriving pathloss estimation values for individual sectors within the cellular communication network comprises:
   generating pathloss reference values for each sector from received pathloss data;
   calculating pathloss estimate values for each sector based on sector specific parameters; and calibrating the sector specific parameters individually for each sector using the pathloss reference.

8. The method of claim 7, wherein pathloss reference values are generated for each sector by way of arranging received pathloss data for each sector into area bins, and for each sector the method comprises generating bin Ec/Io reference values based on the received pathloss data.

9. The method of claim 7, wherein pathloss estimate values for each sector are calculated by way of calculating a pathloss value (PL) for each area bin within the sector by way of a standard slope intercept formula comprising sector specific parameters, and using the pathloss value (PL) for each bin to calculate an Ec/Io estimate value for each bin.

10. The method of claim 7, wherein the sector specific parameters are calibrated by:
comparing the pathloss estimate values with the pathloss reference values;
generating a baseline error value for the sector from a result of the comparison;
refining the sector specific parameters and re-calculating the pathloss estimate values;
comparing the re-calculated pathloss estimate values with the pathloss reference values;
generating a new error value for the sector from a result of comparing the re-calculated pathloss estimate values with the pathloss reference values; and
comparing the new error value to the baseline error value.

11. The method of claim 7, wherein once the sector specific parameters for all sectors have been calibrated, bin-specific pathloss parameters are refined.

12. The method of claim 1, wherein location information corresponding to the plurality of wireless communication unit is obtained by way of geo-location techniques.

13. The method of claim 1, wherein location information corresponding to the plurality of wireless communication units is obtained by way of Global Positioning System (GPS) techniques.

14. The method of claim 1, wherein the pathloss data and location information are obtained over a period of time to maintain coherency of the data.

15. The method of claim 1, wherein the method further comprises dividing a sector into sub-sectors, associating received pathloss data with individual sub-sectors based at least partly on the location information for the respective wireless communication units, and deriving pathloss estimation values for individual sub-sectors within the cellular communication network based at least partly on the received pathloss data.

16. A network element for a cellular communication system comprising signal processing logic arranged to:

receive pathloss measurement data obtained from a plurality of wireless communication units located within the cellular communication network;
receive location information corresponding to the plurality of wireless communication units;
associate received pathloss measurement data with individual sectors within a coverage area of the cellular communication network based at least partly on the location information for the respective wireless communications units that sent the pathloss measurement data and location information;
filtering out unreliable received pathloss measurement data, wherein the filtering out comprises filtering out received pathloss measurement data corresponding to locations outside an antenna main lobe for a sector; and
derive pathloss estimation values for individual sectors within the cellular communication network based at least partly on the received pathloss measurement data.

17. A computer-readable storage element having computer-readable code stored thereon for programming a signal processing logic module to perform a method for deriving pathloss estimation values within a cellular communication network, the code operable for:
receiving pathloss measurement data obtained from a plurality of wireless communication units located within the cellular communication network;
receiving location information corresponding to the plurality of wireless communication units;
associating received pathloss measurement data with individual sectors within a coverage area of the cellular communication network based at least partly on the location information for the respective wireless communication units that sent the pathloss measurement data and location information;
filtering out unreliable received pathloss measurement data, wherein the filtering out comprises filtering out received pathloss measurement data corresponding to locations outside an antenna main lobe for a sector; and
deriving pathloss estimation values for individual sectors within the cellular communication network based at least partly on the filtered pathloss measurement data.

18. The computer-readable storage element of claim 17, wherein the computer-readable storage medium comprises at least one of a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), and a Flash memory.

* * * * *